United States Patent
Jose

(10) Patent No.: US 10,116,429 B2
(45) Date of Patent: Oct. 30, 2018

(54) SYSTEM AND METHOD FOR ADAPTIVE CLOCK/TIME SYNCHRONIZATION BETWEEN DEVICES IN A NETWORK

(71) Applicant: Wipro Limited, Bangalore (IN)

(72) Inventor: Tinku Malayil Jose, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 229 days.

(21) Appl. No.: 14/827,623

(22) Filed: Aug. 17, 2015

(65) Prior Publication Data

US 2016/0380749 A1    Dec. 29, 2016

(30) Foreign Application Priority Data

Jun. 27, 2015    (IN) .......................... 3249/CHE/2015

(51) Int. Cl.
*H04L 7/00*    (2006.01)
*H04L 12/26*    (2006.01)
(Continued)

(52) U.S. Cl.
CPC .......... *H04L 7/0008* (2013.01); *H04J 3/0641* (2013.01); *H04J 3/14* (2013.01);
(Continued)

(58) Field of Classification Search
None
See application file for complete search history.

(56) References Cited

U.S. PATENT DOCUMENTS 5,557,585 A * 9/1996 Hanai .................... G04R 20/18
    368/10
6,581,110 B1 * 6/2003 Harif ....................... H04L 29/06
    709/248

(Continued)

FOREIGN PATENT DOCUMENTS

CN    102684808    9/2012

OTHER PUBLICATIONS

European Search Report dated May 20, 2016 in European Patent Office in counterpart European Patent No. Application 152023750. 5 pages.

*Primary Examiner* — Viet D Vu
*Assistant Examiner* — James A Edwards
(74) *Attorney, Agent, or Firm* — Finnegan, Henderson, Farabow, Garrett & Dunner LLP

(57) ABSTRACT

This disclosure relates to systems and methods for functionality-specific system time synchronization. In one embodiment, a method is disclosed, which comprises determining whether functionality-specific system time information is available from a first server. If the functionality-specific system time information is available from the first server, a first request for functionality-specific system time information is transmitted to the first server. A first functionality-specific system time is received from the first server. A second functionality-specific system time can then be generated based on the first functionality-specific system time. If the functionality-specific system time information is not available from the first server, after a second request for functionality-specific system time information is received from a second device, the method further comprises determining whether to provide a local functionality-specific system time to the second device.

21 Claims, 7 Drawing Sheets

(51) Int. Cl.
*H04J 3/06* (2006.01)
*H04J 3/14* (2006.01)
*H04L 29/08* (2006.01)
*H04L 29/14* (2006.01)

(52) U.S. Cl.
CPC .......... *H04L 43/10* (2013.01); *H04L 67/1034* (2013.01); *H04L 69/40* (2013.01); *H04L 7/00* (2013.01)

(56) References Cited

U.S. PATENT DOCUMENTS

| | | | |
|---|---|---|---|
| 2003/0200338 A1* | 10/2003 | Fulghum | H04L 29/06 709/248 |
| 2004/0005902 A1* | 1/2004 | Belcea | H04J 3/0667 455/502 |
| 2008/0077657 A1 | 3/2008 | Tagami et al. | |
| 2009/0228732 A1* | 9/2009 | Budde | H04B 7/269 713/400 |
| 2011/0264808 A1* | 10/2011 | Eriksson | H04W 56/00 709/227 |

* cited by examiner

SYSTEM AND METHOD FOR ADAPTIVE CLOCK/TIME SYNCHRONIZATION BETWEEN DEVICES IN A NETWORK

PRIORITY CLAIM

This U.S. patent application claims priority under 35 U.S.C. § 119 to: India Application No. 3249/CHE/2015, filed Jun. 27, 2015. The aforementioned application is incorporated herein by reference in its entirety.

TECHNICAL FIELD

This disclosure relates generally to networking, and more particularly to a system and method for adaptive clock/time synchronization between devices in a network.

BACKGROUND

In a distributed computer system, in which multiple autonomous computers communicate via a computer network, clock synchronization is indispensable for the creation of a reliable and synchronous system. Clock synchronization deals with the understanding of temporal ordering of events produced by concurrent processes. The most common clock synchronization scheme is Network-time Protocol (NTP), which provides a layered client-server architecture based on User Datagram Protocol (UDP) message passing.

One major disadvantage of NTP/SNTP clock synchronization is its susceptibility to unpredictable time delay caused by network and system load. Typically, a NTP client-server synchronization request will be transmitted through various network and system elements. For example, a NTP client application generates the request, which is then transmitted by client system Socket/TCPIP (Transmission Control Protocol/Internet Protocol) layer, via a client Ethernet/WLAN interface, to an Ethernet/WLAN (Wide Local Area Network) network. The request is then received, via a server Ethernet/WLAN interface, by a server system Socket/TCPIP layer. The request is then processed by a NTP server application. The NTP server application then generates a response, which is then transmitted through the aforementioned interfaces and network/system elements, before received by the NTP client application. Each of the aforementioned network/system elements, interfaces, and processes add time delays to the measurement of difference between the server time and the client time. These time delays are largely unpredictable, yet they have to be accurately accounted for, for accurate measurement (and correction) of the time difference between the server and the client.

Conventionally, for clock synchronization, each node in a networked computer system may use a master-slave configuration to periodically generate and send a "heart beat" message. However, this method would cause network congestion due to the frequency of the "heart beat" messages. This network congestion would be further exacerbated when multiple servers receive and respond to these messages. Moreover, it is also undesirable to depend solely on designated servers for clock synchronization, since the clock synchronization can fail when the designated servers become unavailable.

Furthermore, in a conventional system, the global system time at a client device can be directly updated as a result of clock synchronization. However, directly updating the global system time would adversely affect system functionality. For example, if the global system time of the client device is updated as a result of clock synchronization, local client standard functions, such as local synchronized operations, can fail.

SUMMARY

Embodiments of the present disclosure may advantageous provide a system and a method of function-specific-time synchronization over a network which enables a system to be either a requester or a provider of network-time information, based on communication with other servers designated for clock synchronization. Therefore, clock synchronization is still possible when these designated servers become unavailable. Embodiments may also advantageously provide a system and a method of function-specific-time synchronization over a network which enables adaptive collection of network-time information, as well as adaptive generation of function-specific-time based on the collected network-time information, which reduces the network load while maintaining the accuracy of clock synchronization.

In one embodiment, a processor-implemented functionality-specific system time synchronization method is disclosed. The method comprises determining whether functionality-specific system time information is available from a first server.
If the functionality-specific system time information is available from the first server, the method comprises transmitting a first request for functionality-specific system time information to the first server, receiving a first functionality-specific system time from the first server, and generating a second functionality-specific system time based on the first functionality-specific system time. If the functionality-specific system time information is not available from the first server, the method comprises, after receiving a second request for functionality-specific system time information from a second device, determining whether to provide a local functionality-specific system time to the second device.

In another embodiment, a functionality-specific system time synchronization system is disclosed. The system comprises one or more hardware processors, and one or more memory units storing instructions executable by the one or more hardware processors. When executed, the instructions cause the one or more hardware processors to perform a method. The method comprises determining whether functionality-specific system time information is available from a first server.

If the functionality-specific system time information is available from the first server, the method comprises transmitting a first request for functionality-specific system time information to the first server, receiving a first functionality-specific system time from the first server, and generating a second functionality-specific system time based on the first functionality-specific system time. If the functionality-specific system time information is not available from the first server, the method comprises, after receiving a second request for functionality-specific system time information from a second device, determining whether to provide a local functionality-specific system time to the second device.

In yet another embodiment, a non-transitory computer-readable medium is disclosed, storing computer-executable functionality-specific system time synchronization instructions. When executed, the instructions cause the one or more hardware processors to perform a method. The method comprises determining whether functionality-specific system time information is available from a first server.

If the functionality-specific system time information is available from the first server, the method comprises transmitting a first request for functionality-specific system time information to the first server, receiving a first functionality-specific system time from the first server, and generating a second functionality-specific system time based on the first functionality-specific system time. If the functionality-specific system time information is not available from the first server, the method comprises, after receiving a second request for functionality-specific system time information from a second device, determining whether to provide a local functionality-specific system time to the second device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments of the present disclosure provide improved methods and systems for clock synchronization over a network. The disclosed embodiments may synchronize a functionality-specific system between a client device and a server a without updating the global system time at the client device. The disclosed embodiments may determine whether functionality-specific system time information is available from a first server. If the functionality-specific system time information is available from the first server, the disclosed embodiments may transmit a first request for functionality-specific system time information to the first server, receive a first functionality-specific system time from the first server, and generate a second functionality-specific system time based on the first functionality-specific system time. If the functionality-specific system time information is not available from the first server, the disclosed embodiments may, after receiving a second request for functionality-specific system time information from a second device, determine whether to provide a local functionality-specific system time to the second device. The disclosed embodiments may also provide adaptive collection of functionality-specific system time information, as well as adaptive generation of function-specific-time based on the collected functionality-specific system time information.

Accordingly, it may be advantageous to provide methods and systems for improved clock synchronization over a network. The provided methods and systems advantageously allow clock synchronization when designated servers for clock synchronization (e.g., the aforementioned first server) become unavailable. Moreover, the provided methods and systems also advantageously reduce the network load while maintaining the accuracy of clock synchronization.

Figure 1:
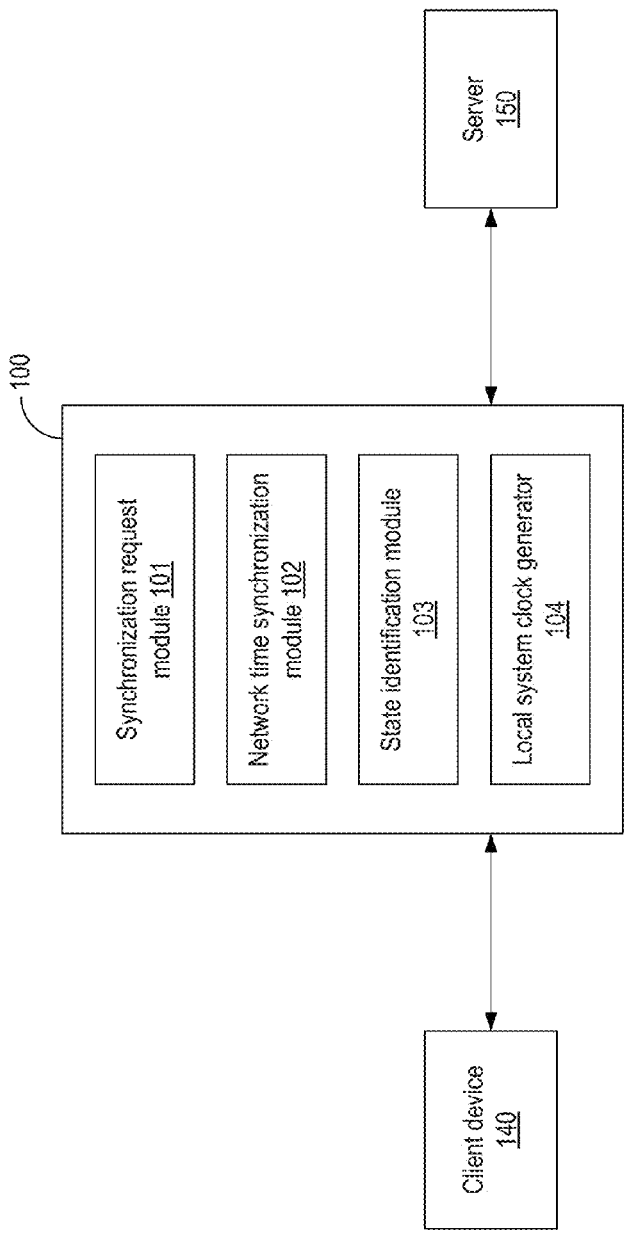
FIG. 1 is a functional block diagram of an example system for adaptive clock/time synchronization according to some embodiments of the present disclosure.

FIG. 1 depicts an example adaptive clock/time synchronization system 100, consistent with embodiments of the present disclosure. Adaptive clock/time synchronization system 100 may include a synchronization request module 101, a network-time synchronization module 102, a state identification module 103, and a local system clock generator 104. System 100 is communicatively coupled with a client service 140 and with a server 150. Server 150 can be a server configured to provide time information for network-time synchronization (e.g., a NTP server). It will be appreciated from this disclosure that the number and arrangement of these components is exemplary only and provided for purposes of illustration. Other arrangements and numbers of components may be utilized without departing from the teachings and embodiments of the present disclosure.

In some embodiments, local system clock generator 104 may include a free running counter. The free running counter can be updated based on timer interrupts, and the counter value can represent a measurement of time elapsed from an arbitrary starting time (EPOCH). A global system time can then be generated by adding the counter value to the EPOCH time. A functionality-specific system time (FSST) associated with a specific application running on system 100 can be generated by adding an offset to the global system time. As to be discussed below, the offset can be updated as a result of network-time synchronization with server 150, and only the FSST but not the global system time is updated as a result of the synchronization.

In some embodiments, synchronization request module 101 is configured to transmit a time request for network-time synchronization to a server (e.g., server 150). The time request may include information such as the IP address of system 100, as well as the FSST of system 100 when the request is transmitted. After transmitting the time request, synchronization request module 101 can receive a time response from the server. The time response can include three FSSTs at the server. The first FSST can represent the time at which the server receives the time request. The second FSST can represent a server time which server 150 transmits for measuring true time difference between server 150 and system 100. The third FSST can represent the time at which the server transmits the time response.

In some embodiments, network time synchronization module 102 is configured to synchronize system 100's FSST with server 150's FSST based on the response received by synchronization request module 101. For example, a difference between system 100's FSST and the server 150's FSST can be calculated using the following formulae (i)-(iii):

$$\text{server\_process\_time} = \text{sr\_send\_time} - \text{sr\_recevied\_time} \quad \text{(i)}$$

$$\text{transmit\_time} = \text{cl\_recieved\_time} - \text{cl\_send\_time} - \text{server\_process\_time} \quad \text{(ii)}$$

$$\text{diff} = \text{server\_time} - \text{curr\_client\_time} - \text{transit\_time}/2 \quad \text{(iii)}$$

In the above formulae, sr_received_time and sr_send_time can be the aforementioned first and third FSSTs of the time response, and server_time can be the aforementioned second FSST of the time response. Moreover, cl_send_time can be the FSST at which system 100 transmits the time request, cl_received_time can be the FSST at which system 100 receives the response from server 150, while curr_client_time is a current FSST at system 100 to be synchronized with server 150. The time difference can then be used to update the aforementioned offset with respect to the global system time at system 100, to update the current FSST at system 100. Each of the aforementioned FSSTs can represent samples of measurements of the system load (e.g., server_process_time) and network latency (e.g., transit_time) that are needed to calculate the true time difference between system 100 and server 150.

The measurement of system load and network load (as performed by generation of time request by synchronization request module 101), and the updating of current FSST (as performed by network-time synchronization module 102) can be performed periodically to improve the accuracy of synchronization. As to be described later, in some embodiments, the periods of generation of time request generation and updating of current FSST can be made adaptive and adjustable based on, for example, the calculated time difference.

In some embodiments, system 100 can also act as a provider of network-time information for network-time synchronization with other devices, if server 150 is not available. In some embodiments, state identification module 103 is configured to search for a server that is capable of being a provider of network-time information, before synchronization request module 101 transmits the time request. For example, state identification module 103 can monitor for a server-announce message broadcasted by other servers. In some embodiments, state identification module 103 can also broadcast or multicast a server-probe request on a predefined IP/UDP (User Datagram Protocol) port, and can monitor for a server-probe response from another device configured to provide network-time information. Both the server-announce message and the server-probe request can include an identifier (e.g., an IP address) associated with the server. In some embodiments, the server-probe request is transmitted periodically (e.g., every 30 seconds).

If a server-probe response or a server-announce message is received within a predetermined time, state identification module 103 can determine that system 100 will act as a requester of network-time information for network-time synchronization. Synchronization request module 101 can then be configured to transmit a time request to the server based on the identifier included in the server-probe response or server-announce message.

On the other hand, if neither a server-probe response nor a server-announce message is received within the predetermined time, state identification module 103 can determine that system 100 will act as a provider of time information for network-time synchronization with other devices. Based on the determination, synchronization request module 101 can be configured to receive time requests from other devices, and to provide time responses after receiving the time requests. Moreover, state identification module 103 (or other parts of system 100) can maintain a state that indicates whether system 100 is configured to act as a provider or as a requester of network-time information, and update the state based on the determination as well.

Moreover, as discussed before, the server-probe request can also include a counter value (e.g., generated by local system clock generator 106 of FIG. 1). In some embodiments, state identification module 103 can be configured to include the counter value of local system clock generator 104 in the server-probe request. After state identification module 103 transmits a server-probe request, it can also monitor for server-probe requests that also include counter values. If state identification module 103 detects such a request, it can compare the counter value included in the request against its own counter value. Based on a result of the comparison (e.g., the counter value included in request is larger than its own counter value), state identification module 103 can determine to allow the device that generates the request to be the provider of time information, and that system 100 is to become a requester of network-time information. Such an arrangement can be used to prevent two devices with similar capabilities as system 100 from becoming a provider of time information at the same time.

FIG. 2A-2D depict an example adaptive clock/time synchronization method 200. In some embodiments, method 200 may be implemented as one or more computer programs executed by one or more processors. Moreover, in some embodiments, at least part of method 200 may be implemented by an adaptive clock/time synchronization system (e.g., adaptive clock/time synchronization system 100) having one or more processors executing one or more computer programs stored on a non-transitory computer readable medium.

Figure 2A:
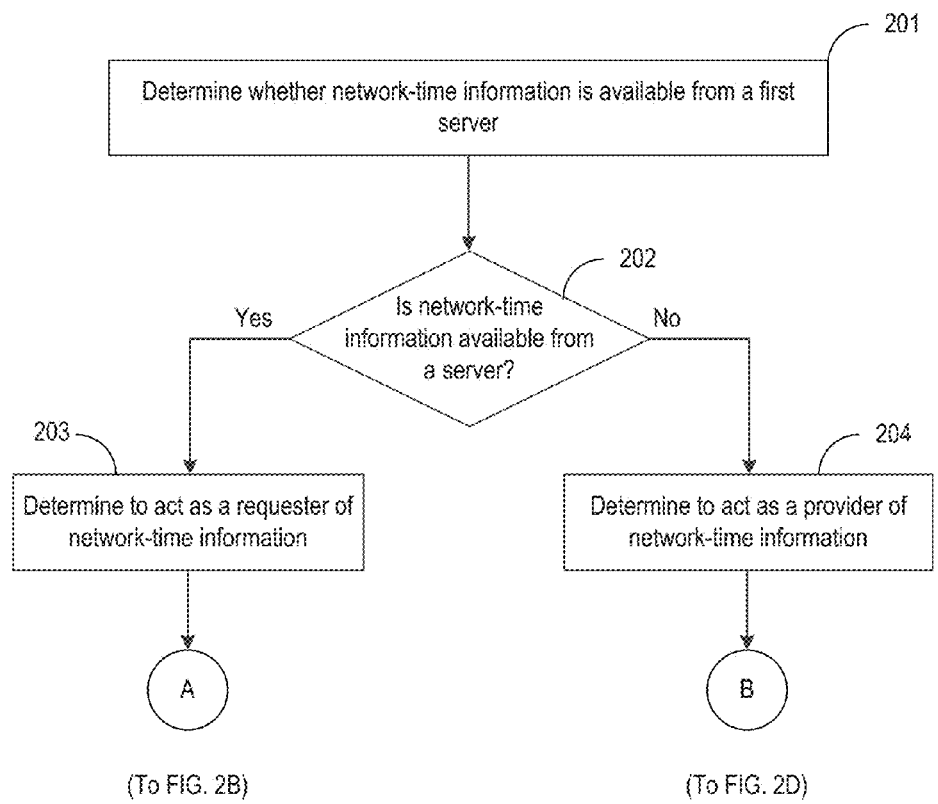
FIGS. 2A-2D are flowcharts illustrating an example method for adaptive clock/time synchronization according to some embodiments of the present disclosure.

Reference is now made to FIG. 2A. In step 201, the system may determine whether network-time information is available from a server (e.g., server 150 of FIG. 1). In some embodiment, step 201 may include transmitting a server-probe request (e.g., periodically after every 30 seconds), and monitoring for a server-probe response or a server-announce message. In some embodiments, step 201 can be implemented by, for example, state identification module 103. If network-time information is determined to be available from the server (step 202) based on, for example, the system receiving a server-probe response or a server-announce message, the system can determine to act as a requester of network-time information, in step 203. If network-time information is determined to be not available from the server (step 202) based on, for example, the system receiving neither a server-probe response nor a server-announce message within a predetermined time, the system can determine to act as a provider of network-time information, in step 204. In some embodiments, steps 201 to 204 can be performed by state identification module 103 of FIG. 1.

Figure 2B:
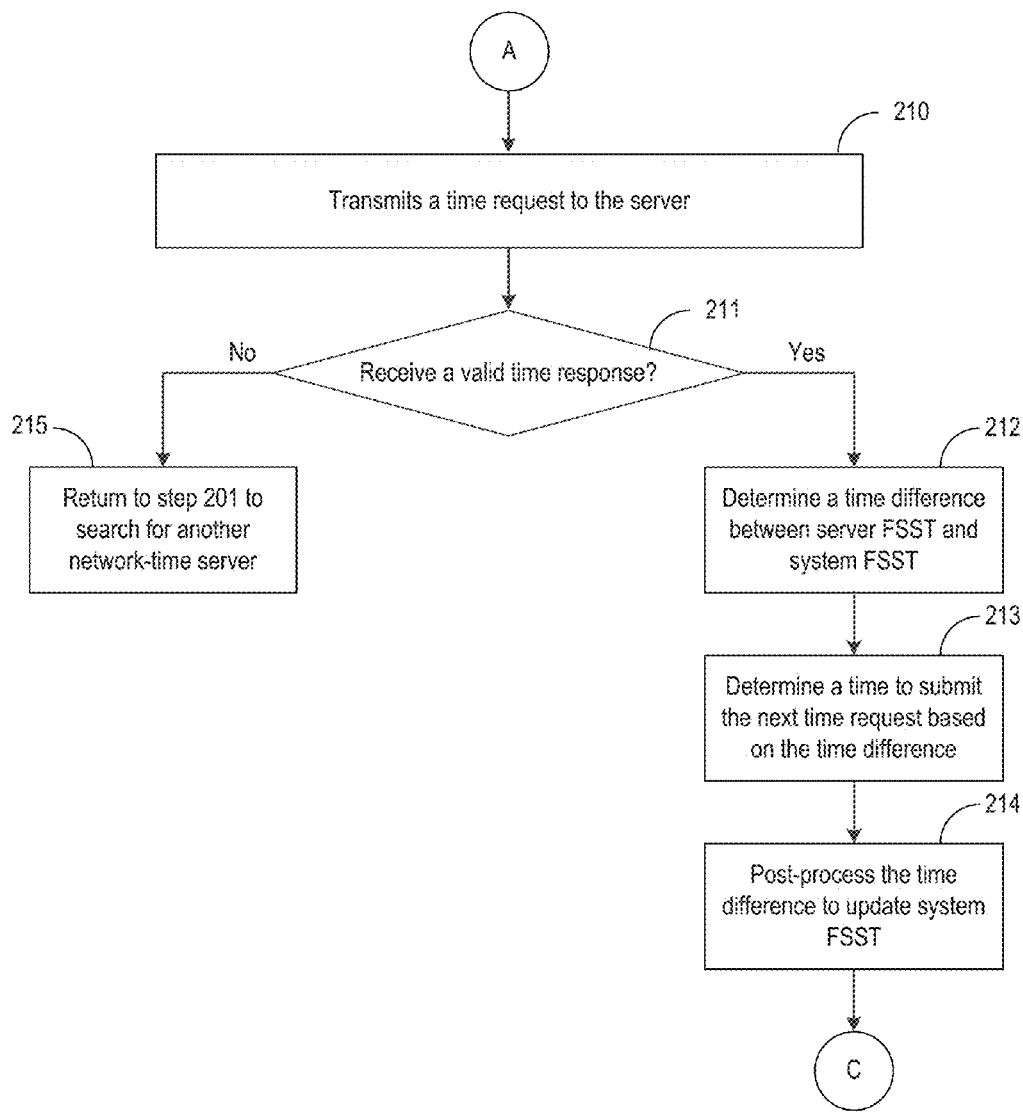

Reference is now made to FIG. 2B, which depicts the steps of method 200 that follows after the system determines to act as a requester of network-time information in step 204. In step 210, the system may transmit a time request to the server identified in the server-probe response or the server-announce message. The time request can include, for example, the IP address of the system, as well as the FSST of the system when the request is transmitted. In step 211, the system may determine whether a valid time response is received. The time response can include three FSSTs configured to represent the time at which the server receives the time request, a server time provided for measuring time difference between the server and the system, and a time at which the server transmits the time response. If a valid response is received (e.g., a time response that includes three FSSTs), the system can perform step 212 to determine a time difference between server FSST and system FSST based on aforementioned formulae (i)-(iii).

Based on the time difference calculated in step 212, the system can determine a time to submit the next time request, in step 213. Network-time synchronization between a server and a client can occur periodically to improve the tracking of the network and system delay, which can then improve the tracking of the difference between the server time and the client time. However, performing the synchronization at fixed intervals may not be needed if, for example, the difference between the server and the client is very small, or if the difference does not vary beyond a certain range. In such cases, the return for performing synchronization at fixed intervals has diminished, and the intervals when synchronization is performed can be extended to reduce system and network load. Accordingly, in step 213, the system can either compare the difference against a threshold, or compare the difference against a prior difference obtained in a prior time request. If the difference (or the change of differences) is below a threshold, the system can push out the time for the next time request by, for example, increasing the synchronization interval. The interval can be increased each time the difference is determined to below the threshold, until the interval reaches a predetermined maximum. On the other hand, if the difference exceeds the threshold, the system can revert back to a default interval to speed up the synchronization, so as to correct the difference more promptly.

Figure 3:
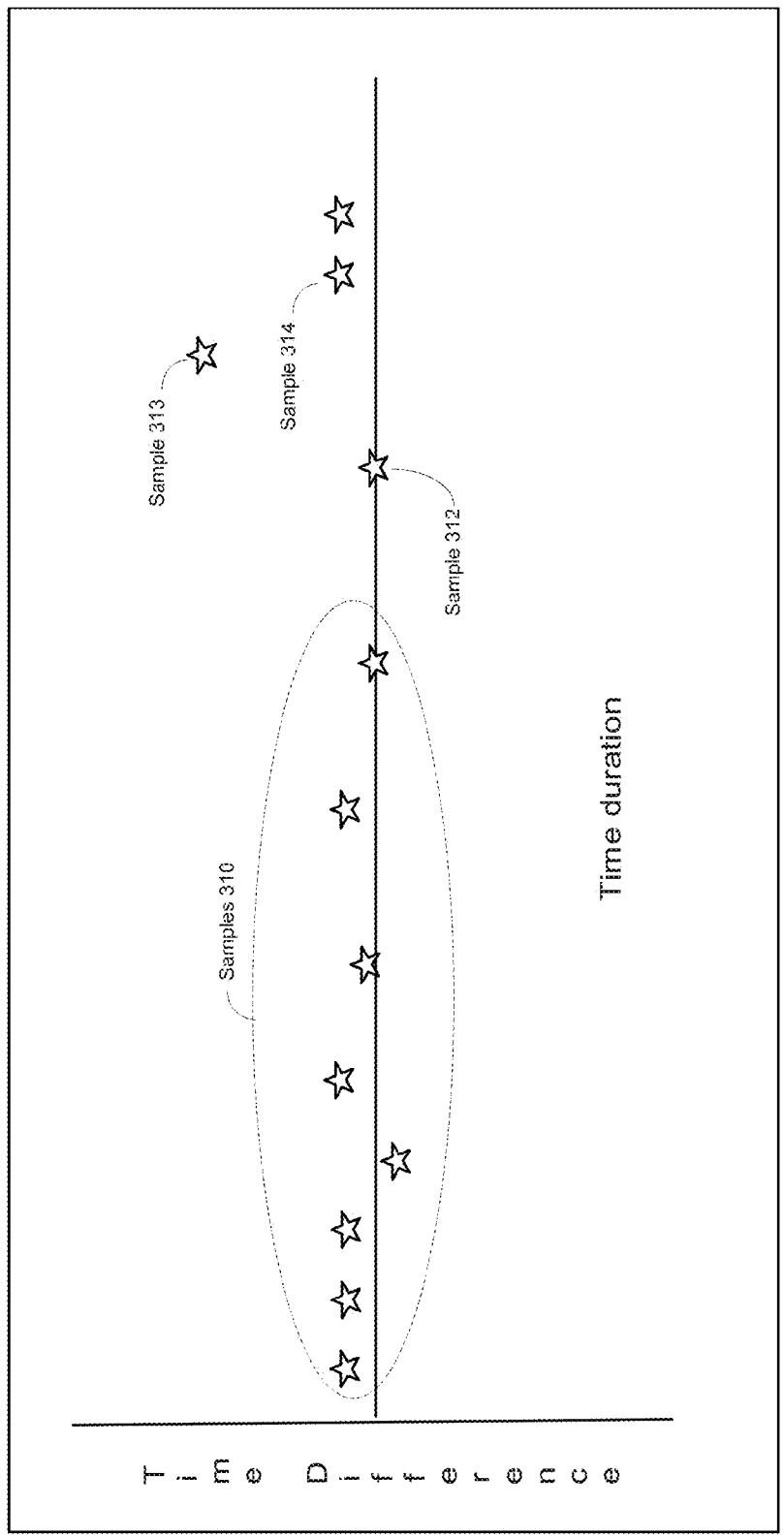
FIG. 3 is a chart depicting a result of adaptive clock/time synchronization provided by embodiments of the present disclosure.

Reference is now made to FIG. 3, which illustrates a result of adaptively setting the synchronization intervals based on the time difference. In FIG. 3, the x-axis represents the timestamp at which each time difference sample is acquired, while the y-axis represents the value of the time difference. As shown in FIG. 3, time difference samples 310 are within a certain predetermined range. As a result, the time interval between the acquisition of each of time difference samples 310 increases, thereby reducing the number of requests sent, and the resulting network load and system load. Following the acquisition of sample 313, which shows a jump in the time difference compared with sample 312, the acquisition of sample 314 occurs at a shorter interval from that of sample 313, when compared with the acquisition time intervals for samples 310, so as to correct the difference more promptly. As a result of the correction, the time difference of sample 314 becomes within the range of samples 310 again. With such arrangements, network-time synchronization can be performed more efficiently without compromising the accuracy of the synchronization.

Referring back to FIG. 2B, after the time to submit the next time request is determined in step 213, the system can post-process the difference in step 214. The difference can then be used to update the system FSST (e.g., by updating the aforementioned offset). On the other hand, if the system does not receive a valid time response in step 211, it can perform step 215 to return to step 201 of FIG. 2A to search for another network-time providing server. In some embodiments, steps 210, 211, and 215 can be performed by synchronization request module 101 of FIG. 1, while steps 212 to 214 can be performed by network-time synchronization module 102 of FIG. 1.

Figure 2C:
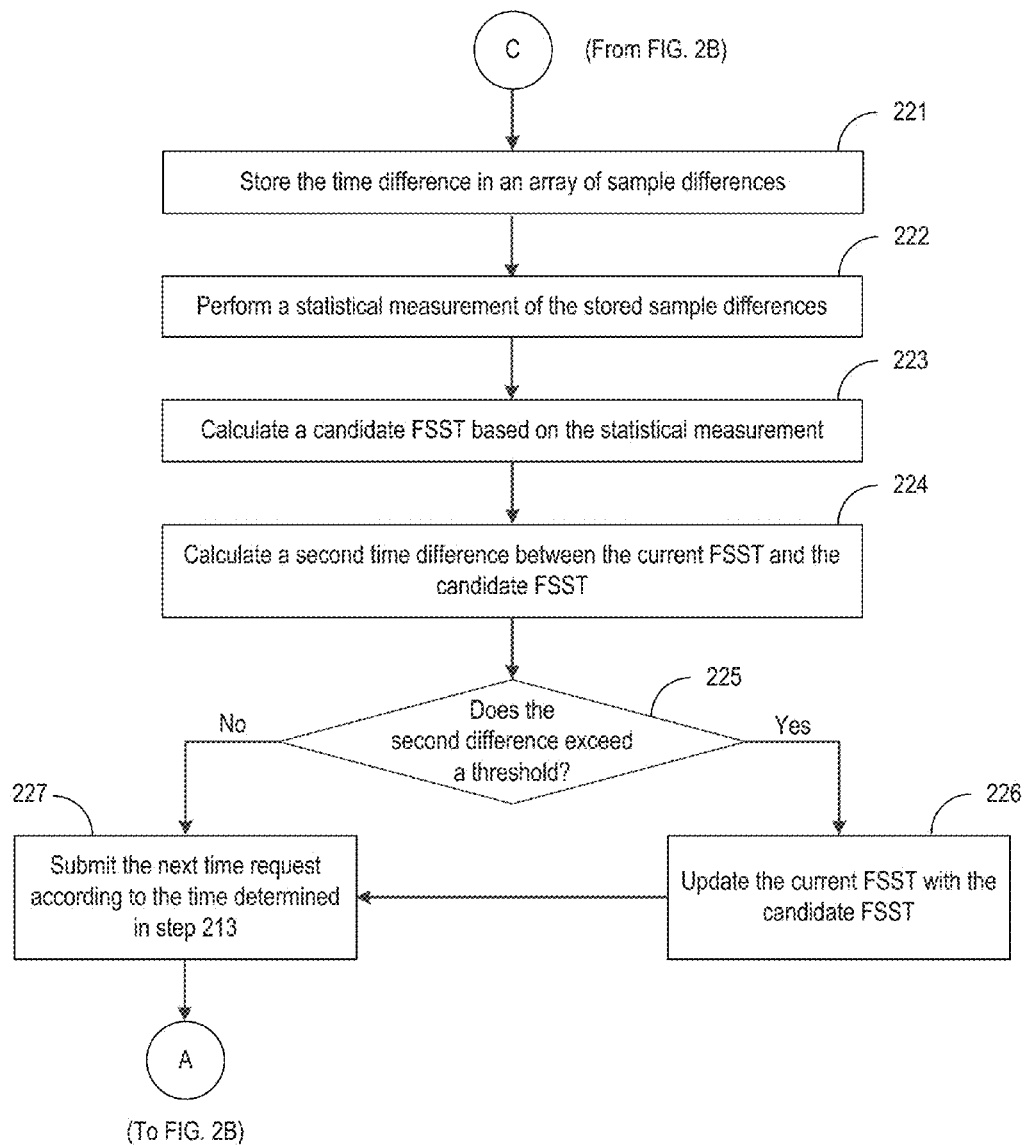

Reference is now made to FIG. 2C, which depicts the steps of method 200 for post-processing the difference, following step 214 of FIG. 2B. In step 221, the system may store the time difference calculated in step 212 of FIG. 2B in an array of sample time differences calculated from prior time requests. In step 222, the system may perform a statistical measurement of the sample time differences stored in the array. For example, the system can determine a median sample time difference. Such an arrangement allows an off-shoot time difference value to be filtered out for the FSST calculation, which makes the calculation more consistent. On the other hand, a stored time difference, even if being regarded as an off-shoot at this point, can remain in the array. If a few more similarly-valued time differences are calculated in the subsequent time requests, these time differences can lead to a different median sample time difference to be used for the generation of subsequent FSSTs.

After the system performs the statistical measurement in step 222, the system may calculate a candidate FSST based on the statistical measurement, in step 223. The system may then calculate a second time difference between the current FSST and the candidate FSST, in step 224. If the second time difference exceeds a predetermined threshold, the system can replace the current FSST with the candidate FSST, to perform the network-time synchronization, in step 226.

In some embodiments, in addition to replacing the current FSST with the candidate FSST, the system may also clear the array of sample time differences. With such an arrangement, a new set of sample time differences can be collected to evaluate the effect of the network-time synchronization on the time difference, and to update the current FSST based on the new set of sample time differences. On the other hand, if the second time difference is determined to be below the predetermined threshold in step 225, or after the current FSST is updated in step 226, the system can perform step 227 to transmit the next time request at the time determined in step 213. In some embodiments, steps 221 to 226 can be performed by network-time synchronization module 102 of FIG. 1, while step 227 can be performed by synchronization request module 101 of FIG. 1.

Figure 2D:
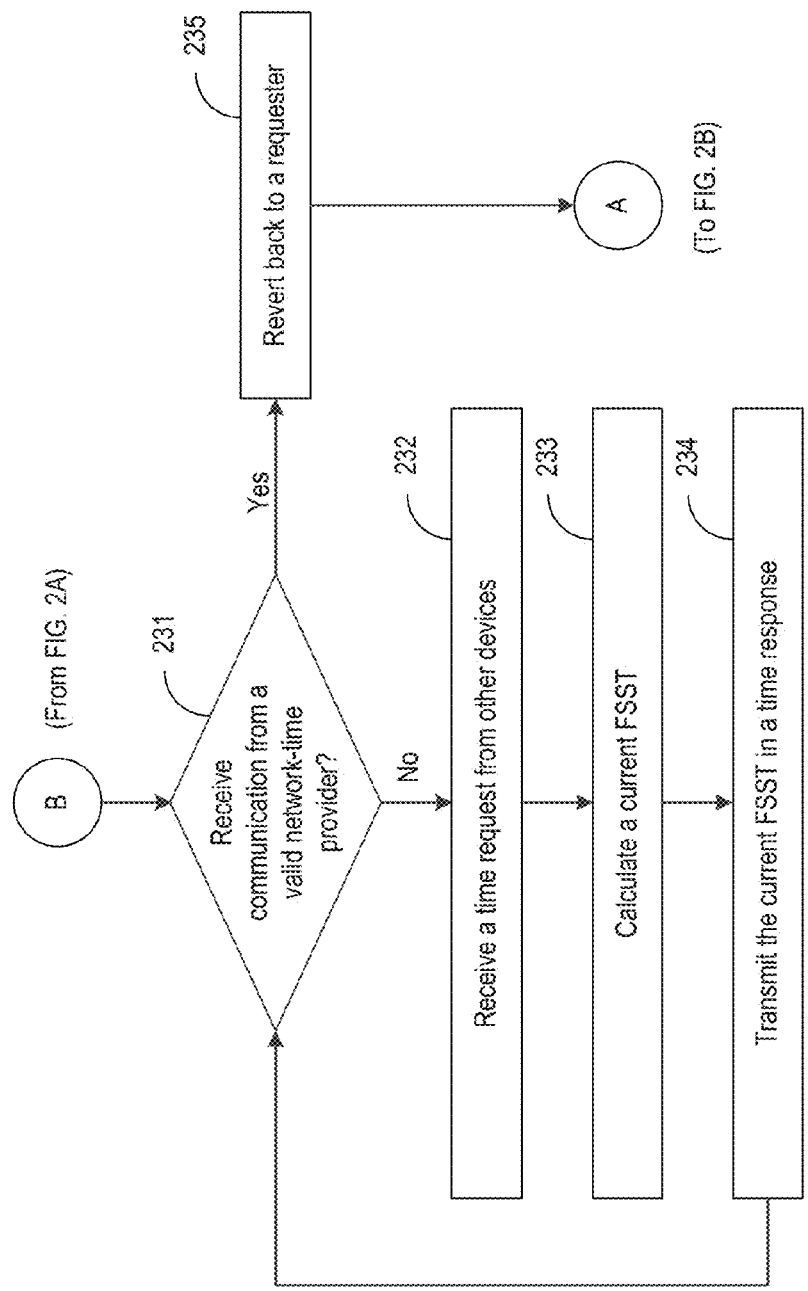

Reference is now made to FIG. 2D, which depicts the steps of method 200 after the system determines to act as a provider of network-time information, in step 204 of FIG. 2A. As shown in FIG. 2D, in step 231, the system may determine whether any communication from other network-time provider is received. Such communication can include, for example, a server-probe response sent by another server not in response to the server-probe request sent by this system, a server-announce that comes late, or a server-probe request sent by other systems. As discussed before, the server-probe request can include a counter value analogous to the one generated by local system clock generator 104 of FIG. 1. The system can compare the counter value in the server-probe request against its own, to determine whether the sender of the request is a valid network-time provider. For example, if the system determines that the counter value in the server-probe request is larger than its own, the system can determine that the sender is a valid network-time provider. The system can then perform step 235 by reverting back to a requester of network-time information, and then go back to step 210 of FIG. 2B to transmit a time request.

On the other hand, if the system determines that no communication from a valid network-time information provider is received in step 231, the system can keep its status as a provider of network-time information, and receive a time request from another device in step 232. The system can then calculate a current FSST based on, for example, the prior time difference and offset calculated in steps 221 to 226 of FIG. 2C. The system can then transmit the current FSST in a time response to the other device in step 234. After the transmission of the current FSST, the system can go back to step 231 to continue to monitor for communication from a valid network-time information provider, and revert back to a requester in step 235 if such communication is received. In some embodiments, steps 231 and 235 can be performed by state identification module 103 of FIG. 1, steps 232 and 234 can be performed by synchronization request module 101 of FIG. 1, while step 233 can be performed by network-time synchronization module 102 of FIG. 1.

With embodiments of the present disclosure, multiple samples of FSSTs at the server and at the client device (e.g., system 100 of FIG. 1) can be collected to measure the true time difference between the server and the client device. As a result, more up-to-date measurement of the system load and network load, as well as their effect on various network elements and interfaces, can be performed, which leads to more accurate measurement of the true time difference between the server and the client. Moreover, the adaptive network-time synchronization scheme according to embodiments of the present disclosure also allows synchronization to be performed more efficiently without compromising accuracy. Furthermore, as a client device can also act as a provider of network-time information when a network-time information providing server is unavailable, the synchronization can become more robust. Lastly, since FSST, instead of the global system time, is updated as a result of synchronization, the synchronization can be carried out for specific client applications, while the effect on other client applications that are not involved in the synchronization can be minimized.

Computer System

Figure 4:
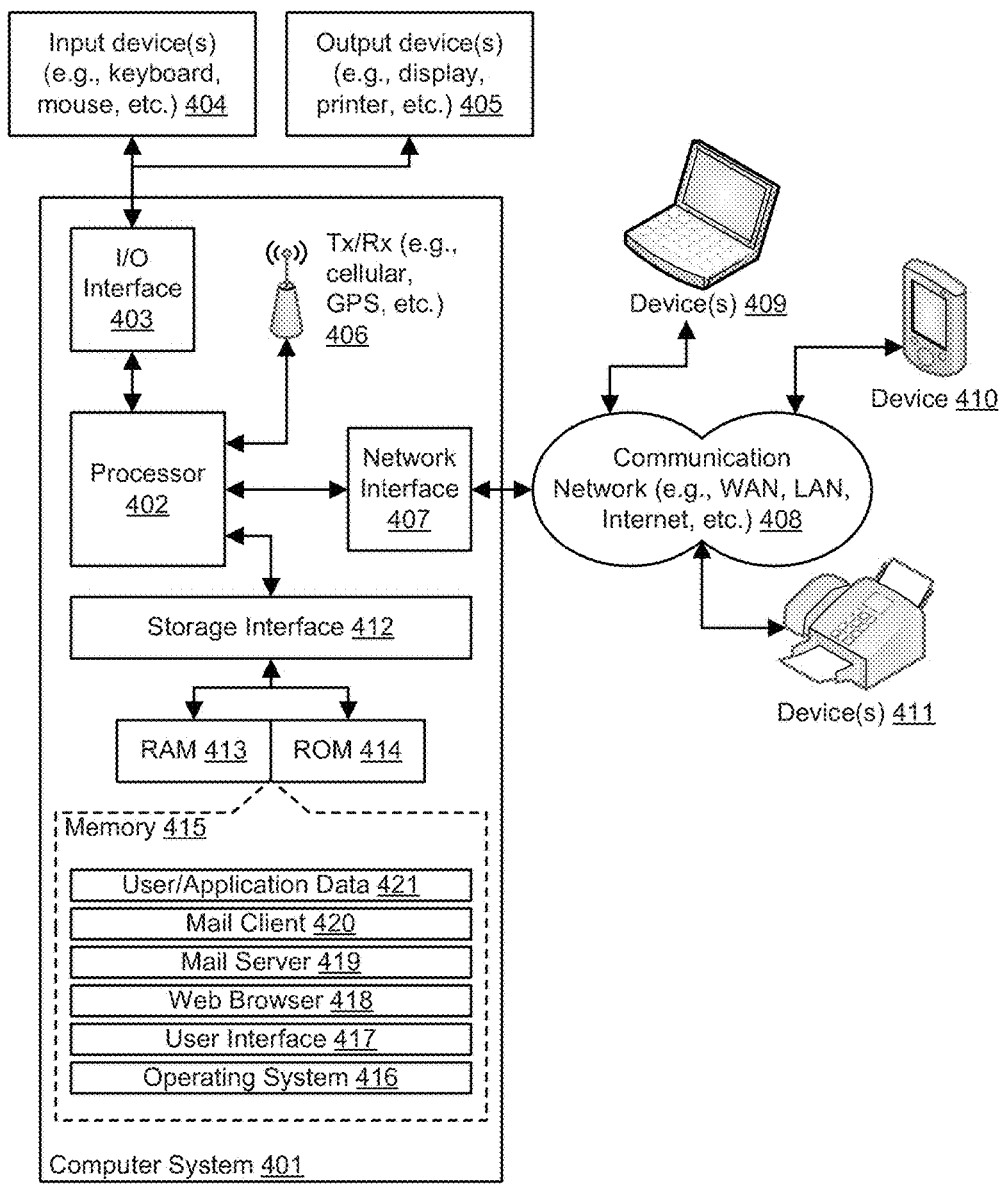
FIG. 4 is a block diagram of an example computer system for implementing embodiments consistent with the present disclosure.

FIG. 4 is a block diagram of an exemplary computer system for implementing embodiments consistent with the present disclosure. Variations of computer system 401 may be used for implementing, for example, synchronization request module 101, network-time synchronization module 102, state identification module 103, and at least part of local system clock generator 104 of FIG. 1. Computer system 401 may comprise a central processing unit ("CPU" or "processor") 402. Processor 402 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, knowledge base 160 of FIG. 1.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. (e.g., configuration and analytic results of the first-level filtering provided by data adaptor 110, analytical reports of the second-level filtering provided by data filtration and funneling engine 120, and reports on recommended clustering and classification techniques provided by recommendation module 133, etc.) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described system and a method for improved knowledge mining. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for functionality-specific system time synchronization over a network, wherein the method is implemented by a processor of a first device and comprises:
   determining whether functionality-specific system time information is available from a first server, wherein a functionality-specific system time to be synchronized is associated with an application running on the first device and is offset from a global system time of the first device;
   if the functionality-specific system time information is available from the first server:
   transmitting a first request for functionality-specific system time information to the first server,
   receiving a first functionality-specific system time from the first server, and
   generating a second functionality-specific system time based on the first functionality-specific system time;

if the functionality-specific system time information is not available from the first server:
  after receiving a second request for functionality-specific system time information from a second device, determining whether to provide the functionality-specific system time to the second device, wherein the functionality-specific system time is not provided to the second device if a first number satisfies a predetermined condition, wherein the first number represents a number of timer interrupts at a third device, the timer interrupts being applied to update a free running counter that measures time elapsed from a starting time, and wherein the first number is included in a third request received for providing the functionality-specific system time information from the third device; and
updating the functionality-specific system time without updating the global system time.

2. The method of claim 1, further comprising:
broadcasting one or more functionality-specific system time synchronization request packets to the network; and
wherein the determination of whether functionality-specific system time information is available from the first server is based on whether a response is received from the first server after the one or more functionality-specific system time synchronization request packets are broadcasted.

3. The method of claim 1, further comprising: storing a second number that represents a number of timer interrupts at the first device; wherein the functionality-specific system time is not provided to the second device if a relationship between the first number and the second number satisfies the predetermined condition.

4. The method of claim 1, wherein generating second functionality-specific system time information based on the first functionality-specific system time information comprises:
determining a difference between the first functionality-specific system time and the second functionality-specific system time; and
generating the second functionality-specific system time based on the difference.

5. The method of claim 4, wherein the difference is determined based on a statistical measurement of one or more historical differences between the first functionality-specific system time and the second functionality-specific system time.

6. The method of claim 5, wherein the functionality-specific system time is updated based on the second functionality-specific system time, if the difference exceeds a predetermined threshold.

7. The method of claim 4, further comprising:
determining a time for transmitting a fourth request for functionality-specific system time information to the first server based on the difference;
wherein a time interval between the transmission of the first request and the transmission of the fourth request is reduced if the difference exceeds a predetermined threshold.

8. A functionality-specific system time synchronization system, comprising:
one or more hardware processors; and
one or more memory units storing instructions executable by the one or more hardware processors for:
  determining whether functionality-specific system time information is available from a first server, wherein a functionality-specific system time to be synchronized is associated with an application running on the first device and is offset from a global system time of the first device;
  if the functionality-specific system time information is available from the first server:
    transmitting a first request for functionality-specific system time information to the first server,
    receiving a first functionality-specific system time from the first server, and
    generating a second functionality-specific system time based on the first functionality-specific system time;
  if the functionality-specific system time information is not available from the first server:
    after receiving a second request for functionality-specific system time information from a second device, determining whether to provide the functionality-specific system time to the second device, wherein the functionality-specific system time is not provided to the second device if a first number satisfies a predetermined condition, wherein the first number represents a number of timer interrupts at a third device, the timer interrupts being applied to update a free running counter that measures time elapsed from a starting time, and wherein the first number is included in a third request received for providing the functionality-specific system time information from the third device; and
  updating the functionality-specific system time without updating the global system time.

9. The system of claim 8, further storing instructions for: broadcasting one or more functionality-specific system time synchronization request packets to the network; and wherein the determination of whether functionality-specific system time information is available from the first server is based on whether a response is received from the first server after the one or more functionality-specific system time synchronization request packets are broadcasted.

10. The system of claim 8, further storing instructions for: storing a second number that represents a number of timer interrupts at the system; wherein the functionality-specific system time is not provided to the second device if a relationship between the first number and the second number satisfies the predetermined condition.

11. The system of claim 8, wherein generating second functionality-specific system time information based on the first functionality-specific system time information comprises the system storing instructions for:
determining a difference between the first functionality-specific system time and the second functionality-specific system time; and
generating the second functionality-specific system time based on the difference.

12. The system of claim 11, wherein the difference is determined based on a statistical measurement of one or more historical differences between the first functionality-specific system time and the second functionality-specific system time.

13. The system of claim 12, further storing instructions for:
updating the functionality-specific system time based on the second functionality-specific system time, if the difference exceeds a predetermined threshold.

14. The system of claim 11, further storing instructions for:
- determining a time for transmitting a fourth request for functionality-specific system time information to the first server based on the difference;
- wherein a time interval between the transmission of the first request and the transmission of the fourth request is reduced if the difference exceeds a predetermined threshold.

15. A non-transitory computer-readable medium storing computer-executable functionality-specific system time synchronization instructions comprising instructions for:
- determining whether functionality-specific system time information is available from a first server, wherein functionality-specific system time to be synchronized is associated with an application running on a first device and is offset from a global system time of the first device;
- if the functionality-specific system time information is available from the first server:
  - transmitting a first request for functionality-specific system time information to the first server,
  - receiving a first functionality-specific system time from the first server, and
  - generating a second functionality-specific system time based on the first functionality-specific system time;
- if the functionality-specific system time information is not available from the first server:
  - after receiving a second request for functionality-specific system time information from a second device, providing the functionality-specific system time to the second device, wherein the functionality-specific system time is not provided to the second device if a first number satisfies a predetermined condition, wherein the first number represents a number of timer interrupts at a third device, the timer interrupts being applied to update a free running counter that measures time elapsed from a starting time, and wherein the first number is included in a third request received for providing the functionality-specific system time information from the third device; and
  - updating the functionality-specific system time without updating the global system time.

16. The medium of claim 15, further storing instructions for: broadcasting one or more functionality-specific system time synchronization request packets to the network; and wherein the determination of whether functionality-specific system time information is available from the first server is based on whether a response is received from the first server after the one or more functionality-specific system time synchronization request packets are broadcasted.

17. The medium of claim 15, further storing instructions for: storing a second number that represents a number of timer interrupts at a system; wherein the functionality-specific system time is not provided to the second device if a relationship between the first number and the second number satisfies the predetermined condition.

18. The medium of claim 15, wherein generating second functionality-specific system time information based on the first functionality-specific system time information comprises the system storing instructions for:
- determining a difference between the first functionality-specific system time and the second functionality-specific system time; and
- generating the second functionality-specific system time based on the difference.

19. The medium of claim 18, wherein the difference is determined based on a statistical measurement of one or more historical differences between the first functionality-specific system time and the second functionality-specific system time.

20. The medium of claim 19, further storing instructions for:
- updating the functionality specific system time based on the second functionality-specific system time, if the difference exceeds a predetermined threshold.

21. The medium of claim 18, further storing instructions for:
- determining a time for transmitting a fourth request for functionality-specific system time information to the first server based on the difference;
- wherein a time interval between the transmission of the first request and the transmission of the fourth request is reduced if the difference exceeds a predetermined threshold.

* * * * *